(12) United States Patent
Kalandek

(10) Patent No.: US 7,887,086 B2
(45) Date of Patent: Feb. 15, 2011

(54) CURTAIN AIR BAG MODULE AND MOUNTING CLIP

(75) Inventor: Bruce A. Kalandek, Dearborn, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 224 days.

(21) Appl. No.: 12/209,322

(22) Filed: Sep. 12, 2008

(65) Prior Publication Data

US 2010/0066060 A1 Mar. 18, 2010

(51) Int. Cl.
*B60R 21/213* (2006.01)

(52) U.S. Cl. ............... 280/728.2; 280/730.2; 248/200; 248/225.11

(58) Field of Classification Search .............. 280/728.2, 280/730.2; 248/200, 225.11
See application file for complete search history.

(56) References Cited

U.S. PATENT DOCUMENTS

| | | | |
|---|---|---|---|
| 6,336,779 B1 * | 1/2002 | Jakob et al. ................ | 411/175 |
| 6,450,747 B1 * | 9/2002 | Fischer ....................... | 411/174 |
| 6,851,702 B2 | 2/2005 | Henderson et al. | |
| 6,959,944 B2 * | 11/2005 | Mori et al. ............... | 280/728.2 |
| 7,357,408 B2 | 4/2008 | Hall et al. | |
| 7,547,038 B2 * | 6/2009 | Coleman ................. | 280/728.2 |
| 7,669,883 B2 * | 3/2010 | Giddings et al. ......... | 280/728.2 |
| 2005/0029778 A1 * | 2/2005 | Weber et al. ............. | 280/728.2 |
| 2008/0284141 A1 * | 11/2008 | Jang et al. ................ | 280/728.2 |

* cited by examiner

*Primary Examiner*—Paul N Dickson
*Assistant Examiner*—Drew Brown
(74) *Attorney, Agent, or Firm*—Markell Seitzman

(57) ABSTRACT

An air bag module (50) comprising: a curtain air bag (20) having an inflatable portion and a mounting portion, the mounting portion or tab (30) including opposing first and second mounting sides or surfaces; a mounting bracket or clip (100) for the inflatable curtain air bag, comprising first and second plates (110, 120), each plate engagable with a respective first or second mounting side or surface (104, 106), the first plate having a first opening (160) and the second plate having a second opening (170); the first plate about the first opening, including a plurality of bendable first tabs (164a-d), each first tab deformable through the second opening to provide a crimp contact between the first plate (110) and the second plate (120) thereby trapping the mounting portion or tab (30) of the air bag between the first and second plates.

20 Claims, 6 Drawing Sheets

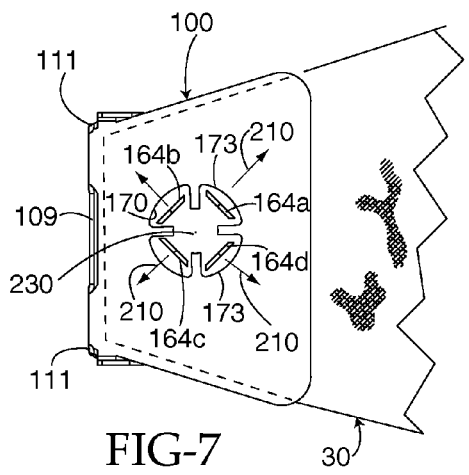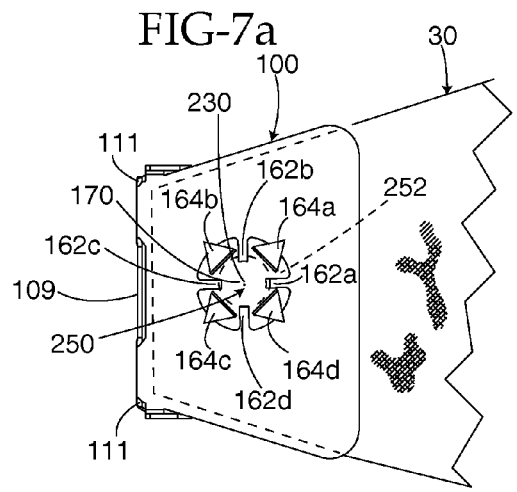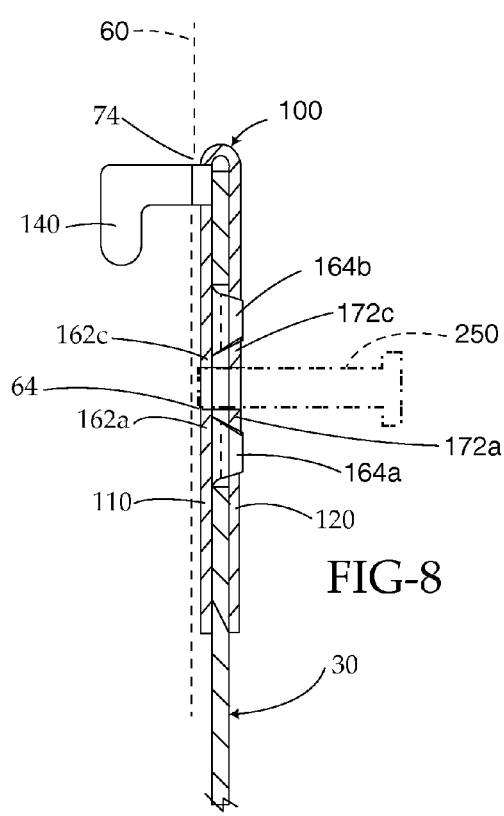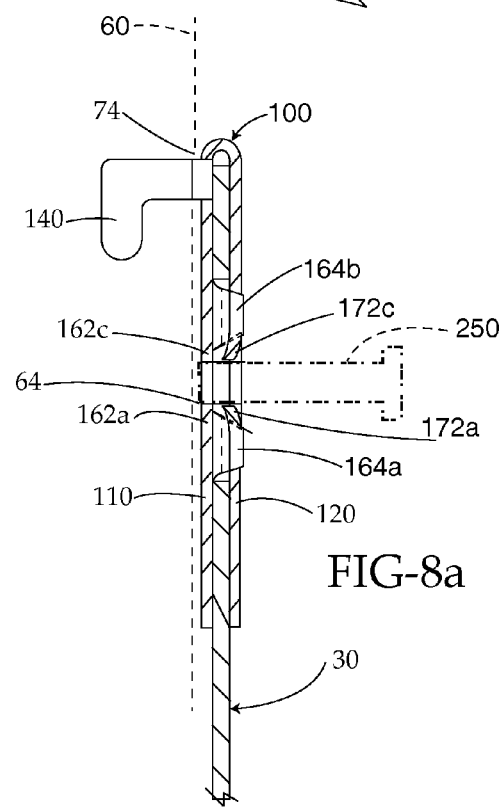

CURTAIN AIR BAG MODULE AND MOUNTING CLIP

BACKGROUND AND SUMMARY OF THE INVENTION

The present invention relates to an air bag module with a mounting clip

Early curtain air bags included a number of tabs which extended from a top region of the air bag, each of the tabs included a mounting hole into which was placed a threaded bolt. Subsequently, the bolt was threaded into and tightened in the roof rail of the vehicle, thereby mounting the air bag to the roof rail. Typically these tabs extended from a narrow, cylindrically-shaped cover that enclosed the previously folded air bag. Prior to installation in the vehicle the air bag inflator was secured to the folded air bag; the air bag, inflator and cover defined the curtain air bag module. During attachment of the module to the vehicle, the module was held generally in place near the roof rail, the operator placed a fastener through one of the tabs and then the fastener was tightened, securing the tabs to the roof rail. Thereafter, mounting bolts were used to secure the remaining tabs. Often, as the curtain air bag was mounted to the vehicle, the tabs would rotate and become twisted as the mounting bolt/fastener was tightened to its full torque upon the roof rail, which made it difficult to properly secure the subsequently secured tabs, which required the operator to repeat portions of the mounting process. A system that prevents this twisting or rotation would be said to include an "anti-twist" feature. Also, these early air bag modules lacked the ability to enable the operator to simply place or locate the air bag to a roof rail prior to securing the air bag via a mounting bolt; having this ability speeds assembly of the air bag/air bag module to the roof rail. Being able to place or locate the air bag prior to tightening the bolts is referred to in the art as "prefixing" or "pre-fixation."

Surprisingly, even though the mounting bolt was tightened to its specified torque limit, over time these mounting bolts tended to become loose due to the changing characteristics of the air bag material forming the mounting tab. The loosening of the bolt is referred to in the art as "backout" or "torque-relaxation" and a system that avoids this deficiency is said to include an anti-backout or "anti-torque relaxation" feature.

It is an object of the present invention to provide a curtain air bag module and mounting clip having one or all of the following features: prefixation, anti-twist, anti-backout ("anti-torque relaxation") as well as the ability to hold or retain a bolt in the clip prior to and during the attachment to the vehicle, which is referred to herein as fastener or bolt retention.

The present invention includes an air bag module comprising: a curtain air bag having an inflatable portion and a mounting portion, the mounting portion including opposing first and second mounting sides or surfaces; a mounting bracket for the inflatable curtain air bag, comprising first and second plates, each plate engagable with a respective first or second mounting side or surface, the first plate having a first opening and the second plate having a second opening; the first plate about the first opening, including a plurality of bendable first tabs, each first tab deformable through the second opening to provide a crimp contact between the first plate and the second plate thereby trapping the mounting portion of the air bag between the first and second plates. The mounting portions of the air bag include tabs extending therefrom and regions of a non-inflatable peripheral border.

BRIEF DESCRIPTION OF THE DRAWINGS

FIGS. 7 and 7a show additional assembly steps.
FIG. 8 is a cross-sectional view showing the mounting fastener (bolt) extending through a mounting clip and air bag tab.
FIG. 8a is another cross-sectional view showing tabs that hold the mounting fastener bent.

DETAILED DESCRIPTION OF THE DRAWINGS

Figure 2:
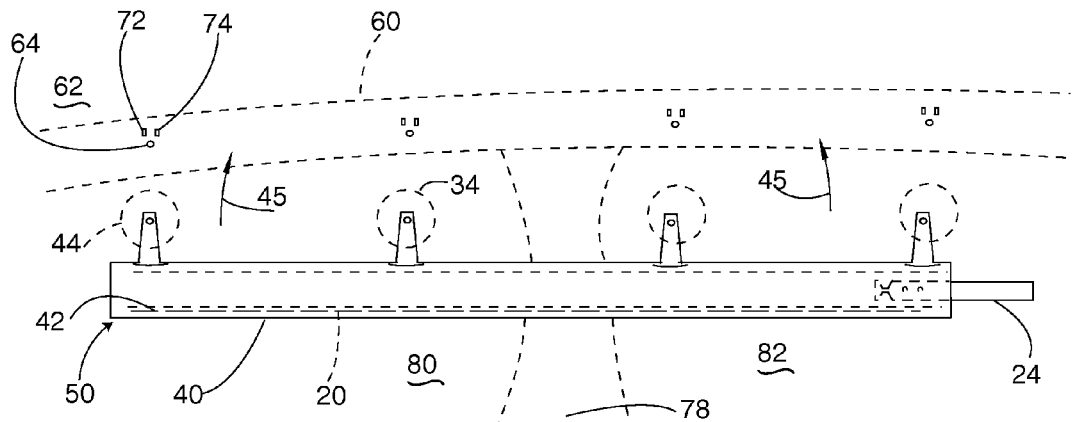
FIG. 2 shows the air bag of FIG. 1 proximate the roof rail of the vehicle.
Figure 1:
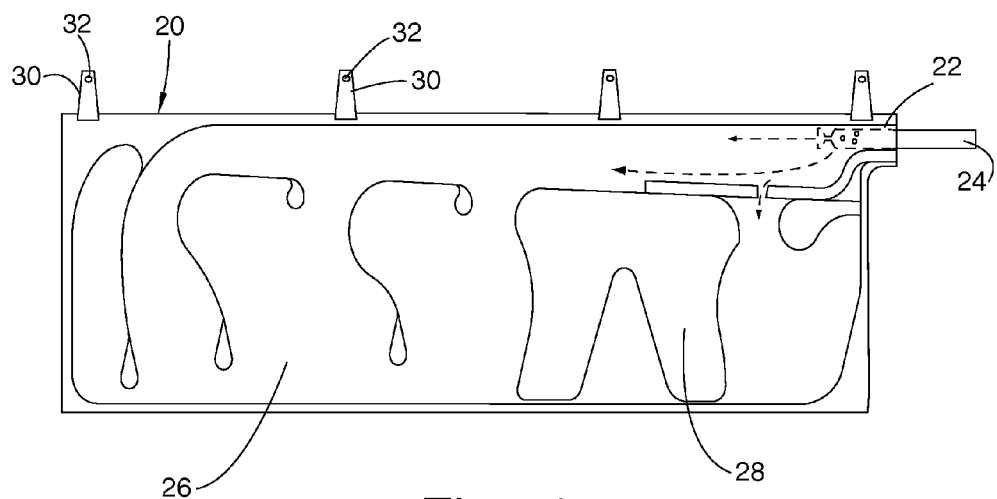
FIG. 1 shows an air bag usable with the present invention.
Figure 9:
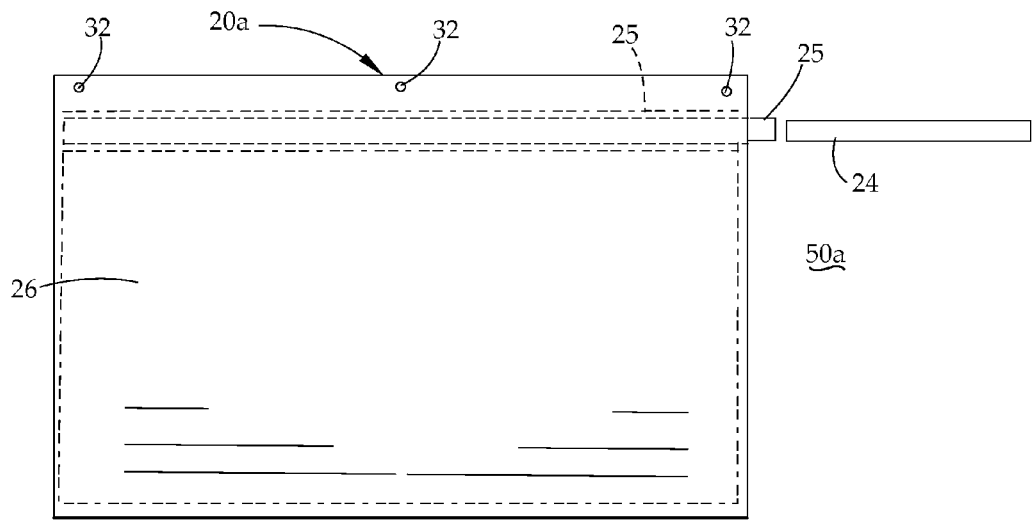
FIG. 9 is a plan view of a curtain air bag with peripheral border mounting areas.
Figure 10:
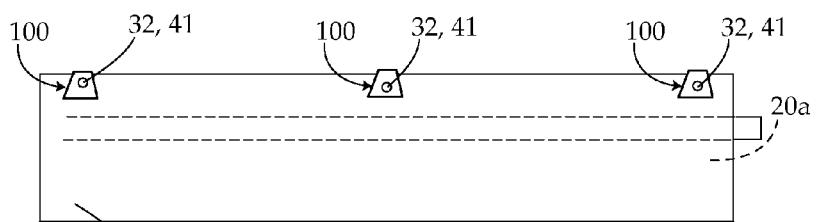
FIG. 10 is a plan view showing the cover above the air bag and a plurality of mounting clips attached to the border area of the cover and border area of the air bag.

Reference is made to FIG. 1 which shows an air bag 20 usable with the present invention. Air bag 20 is a curtain air bag having an inlet 22 to receive an inflator 24. The air bag 20 includes one or more inflatable regions 26 and may include one or more non-inflatable regions 28. Air bag 20 is folded into a compact configuration and is slid into a cylindrically shaped cover 40. Cover 40 includes a line of perforations 42 which facilitate the tearing-open of the cover as the air bag inflates. Air bag 20 includes a mounting region or regions and in the illustrated embodiment these regions include mounting tabs 30, each tab including a mounting opening 32. The tabs can be eliminated and the openings formed in a top-border region of the air bag. An alternate air bag 20a with border mounting regions is shown in FIGS. 9 and 10. FIG. 2 shows the folded air bag 20 within its cover 40. The air bag, cover and inflator form the major components of a curtain air bag module 50. Module 50, as enumerated below, will also include a plurality of mounting tabs 100 and may optionally include mounting fasteners 66 shown in FIG. 4.

FIG. 2 shows a number of dotted circles generally identified by numeral 44 which show the general area where each mounting tab 100 can be attached to a roof rail 60 of a vehicle 62. Arrows 45 show the direction of movement of the air bag and cover to the roof rail. The roof rail includes a plurality of fastener openings 64 each of which can be threaded to receive a mounting bolt or fastener 250 or, alternatively, the roof rail 60 may include a threaded nut 66, shown in FIG. 2 secured to the roof rail which receives fastener 70. A roof rail 60 further includes a plurality of sets of fastener receiving openings 72 and 74, each of which receives a respective hook 140 and 142 of the mounting clip 100. FIG. 2 also diagrammatically illustrates the B-pillar 78 of the vehicle as well as the general areas 80 and 82 identifying the location of the front and rear windows of the typical vehicle.

Figure 3:
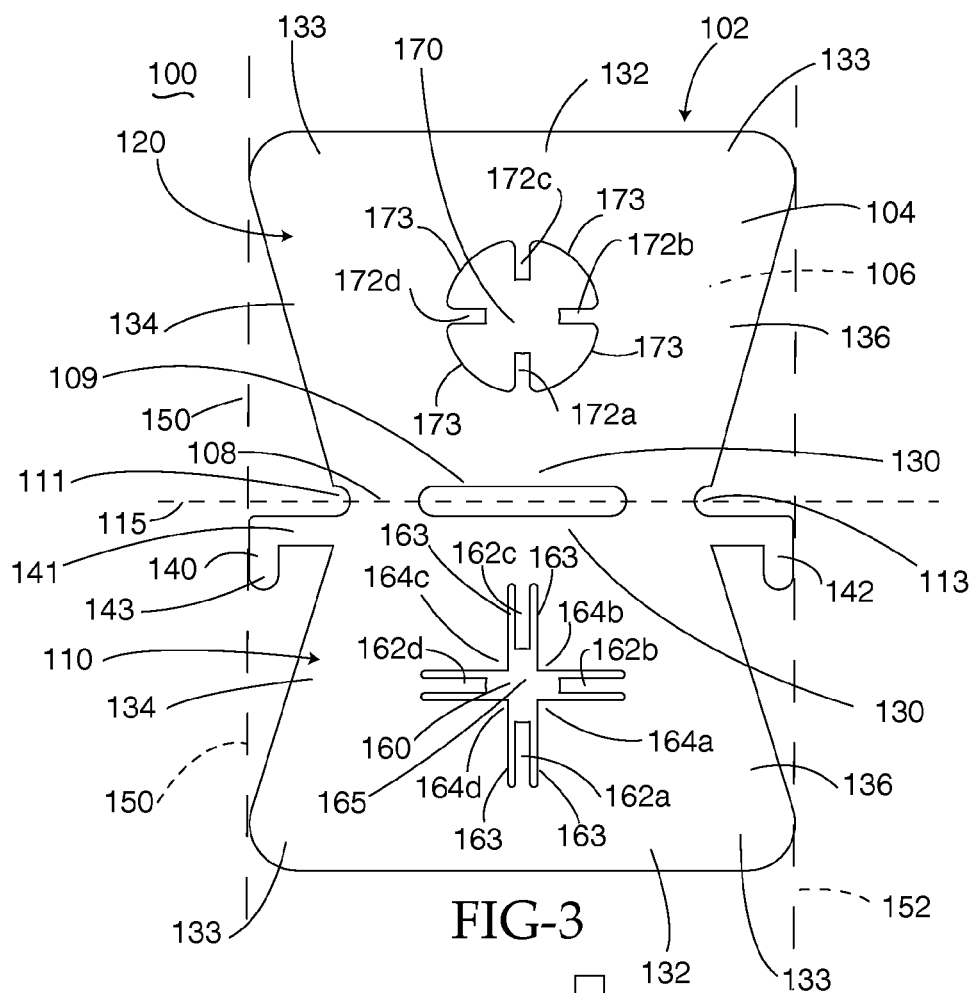
FIG. 3 illustrates a metal stamping that forms the mounting clip of the present invention.

FIG. 3 shows many of the features of a mounting clip 100. Clip 100 is formed of a metal stamping or metal plate 102 having many features stamped thereon. The plate 102 has a first or front surface 104 and an opposing, second or rear surface 106. The clip 100 is formed as two similarly shaped first and second members 110 and 120 respectively. Each of the members 110 and 120, in the illustrated embodiment, is in the form of a trapezoid. Each member has a top 130, a bottom 132 and opposing first and second sides respectively 134 and 136. Each top 130 is narrower than a corresponding bottom 132. Each top 130 meets in a center portion or region 108 of the plate 102. The center region includes an oval opening 109 as well as two oppositely placed cutouts 111 and 113 at the edges of the plate 102. The plate 102 is configured to be bent over its centerline 115; openings 109 and cutouts 111 and 113 facilitate the bending-over of plate 102.

Member 110 includes two integrally formed hooks 140 and 142 which extend oppositely from sides 134 and 136 respectively. The hooks 140 and 142 are spaced below the centerline 115. Each hook is formed, as shown in the drawings, by a first leg 141 that is parallel to the centerline and a second leg 143 that is perpendicular to the centerline. FIG. 3 also includes two phantom or imaginary lines 150 and 152, each of which is tangent to two opposing corners 133 of the opposingly positioned bottoms 132 of each of the members 110 and 120. These lines 150 and 152 identify the sides of the original plate 102 prior to being removed. As can be seen from FIG. 3, each hook 140 and 142 did not extend beyond a respective one of the lines 150 and 152. As can be appreciated, if the hooks 140 and 142 remain interior to these lines, the size of the plate 102 can be reduced providing a corresponding reduction in the cost of clip 100. If however, it is desirable to utilize hooks that are longer or of a different configuration and which extend beyond imaginary lines 150 and 152, this too is part of the invention.

Member 110 includes an opening 160 which is formed in part by the removal of material yielding four narrow tabs 162a-d. These tabs 162a-d are formed by the removal of thin strips of material 163 yielding similar slots and by the removal of the center portion of material 165 which forms the center opening 160. The removal of the strips of material 163 also creates in the first member 110 a second plurality of tabs 164a-d, each of which includes generally perpendicular, intersecting sides.

Member 120 also includes a central opening 170 created by the removal of a clover leaf shaped piece of material from plate 102 yielding another set of four narrow tabs 172a-d. The sides of opening 170 between each adjacent tabs 172a-d are shown by numeral 173.

Figure 4:
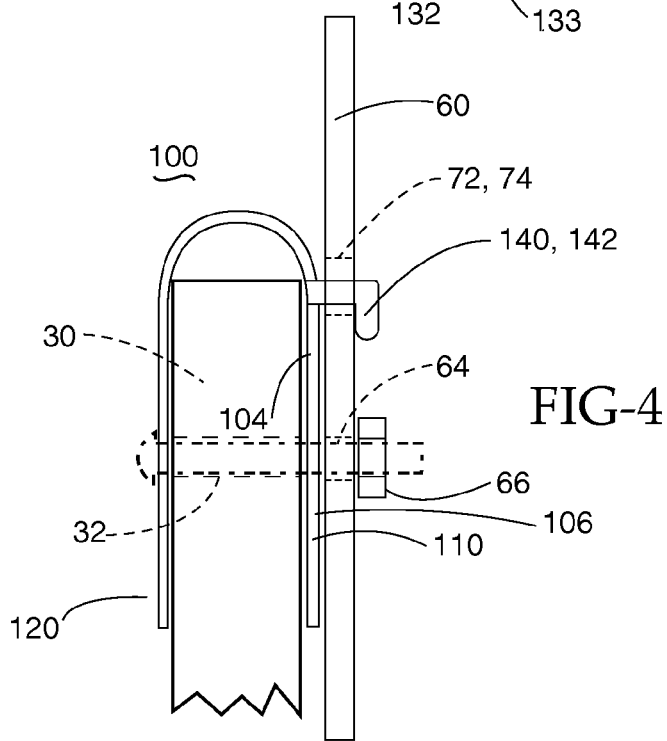
FIG. 4 is a side view of the mounting clip attached to the vehicle roof rail.
Figure 5:
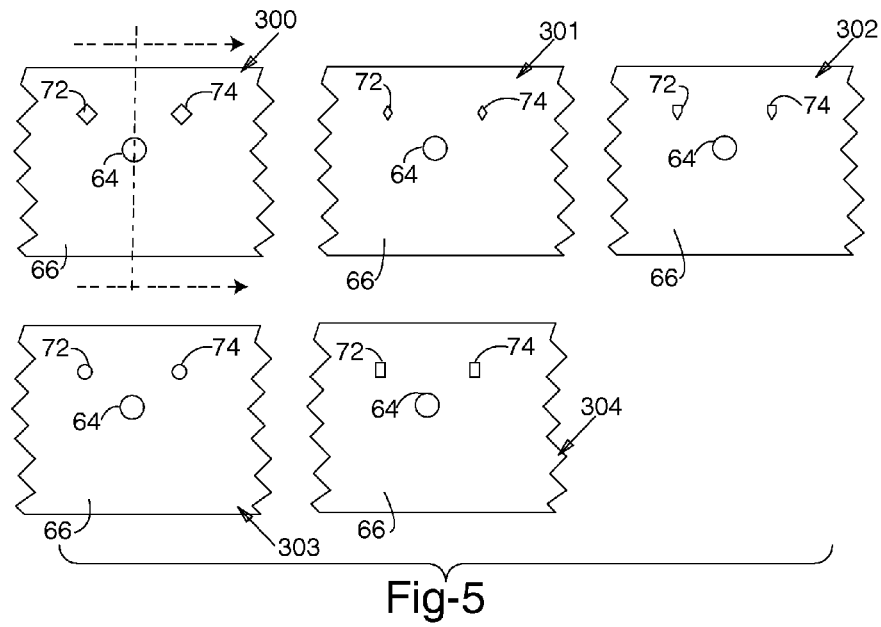
FIGS. 5-5e show various mounting clip openings and means of receiving a fastener.

Reference is briefly made to FIGS. 4 and 5. FIG. 4 shows a partially completed clip 100 which is a U-shaped bi folding plate 102 over centerline 115; further, each arm 140 and 142 has been rotated rearward toward the rear surface 106 of member 110 and extends generally perpendicular to the rear surface 106. FIG. 4 also shows hook 140 (or 142) received within one of the mounting openings 72 (or 74) of the roof rail 60. One of the mounting tabs 30 of the curtain air bag 20 is positioned inside of the bent-over clip 100. As can be appreciated, if the air bag did not include an extending tab, the opening 32 would be formed in a border region of the air bag 20 and this border region would be inserted into the mounting clip 100. FIG. 4 also shows fastener opening 64 in alignment with opening 32 of tabs 30. As mentioned above fastener opening 64 can be threaded to receive a threaded fastener; alternatively, a nut 66 can be secured to the roof rail 60. Nut 66 is also shown in FIG. 4, recognizing that a threaded fastener opening 64 and a threaded nut 66 would not be used at the same time but are only shown in FIG. 4 for the purpose of illustration.

Figure 5A:
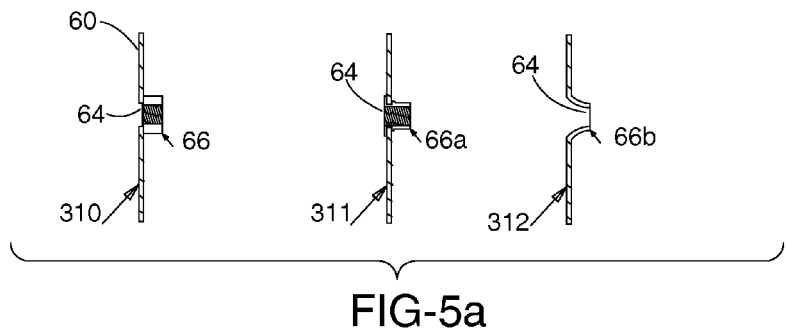
Figure 5C:
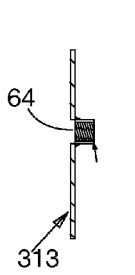
Figure 5B:
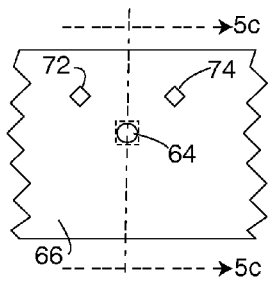
Figure 5E:
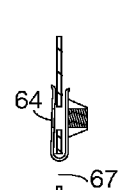
Figure 5D:
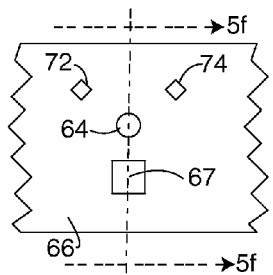

Reference is made to FIGS. 5-5e. FIG. 5 shows five alternate configurations of mounting openings 72 and 74. These five alternates are shown by numerals 300-304. The mounting openings of alternate 300 are rotated squares having a corner facing downward. The alternate 301 shows diamond shaped mounting openings. Alternate 302 shows mounting openings 72 and 74 with squared-off tops and V-shaped bottoms. Alternate 303 shows circular mounting openings while alternate 304 shows rectangular or oblong mounting openings. The mounting openings shown in alternates 300-303 are conceptually similar in that each opening contains a concavely shaped lower portion. Each configuration 300-304 illustrates a circular fastener opening 64. FIG. 5a shows three alternate ways of providing a fastener receiving mechanism in or on the roof rail. Alternate 310 again shows the threaded nut 66 secured to the rear side of the roof rail 60. Alternate 311 shows the use of a threaded rivet-nut 66a, while alternate 312 illustrates the use of a pierce-nut 66b in which the roof rail material is deformed, then pierced and then fitted with threads or alternatively threads need not be provided and a self-threading fastener is used. FIGS. 5b and 5c show the use of a threaded box-nut 66d. FIG. 5d includes an additional opening 67 for a J-clip which is not shown in FIG. 5d. FIG. 5e is a cross-section of the roof rail and shows a J-clip supporting a threaded nut mounted on the roof rail. The J-clip is inserted into the opening 67 and then manipulated to place the threads of the J-clip behind the opening 64 in the roof rail. While FIGS. 5b and 5d show a mounting opening formed of rotated squares, the other mounting hole configurations of alternates 301-304 could also be used. Each of the alternatives showing the various mounting openings permit the vehicle manufacturer to pierce the roof rail to create openings having a shape allowing the installer to easily locate, center and align each mounting clip during installation.

Figure 6:
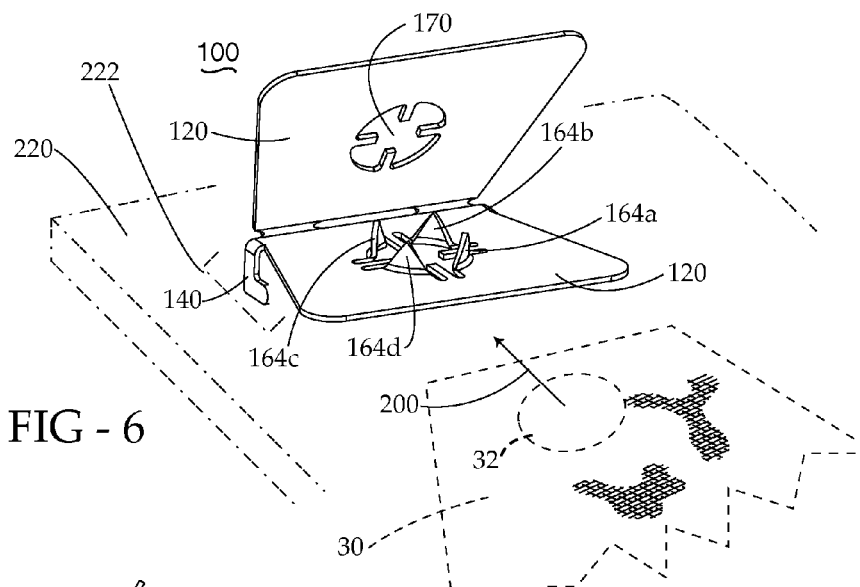
FIGS. 6, 6a and 6b show steps in forming the mounting clip and mounting same to an air bag tab.
Figure 6A:
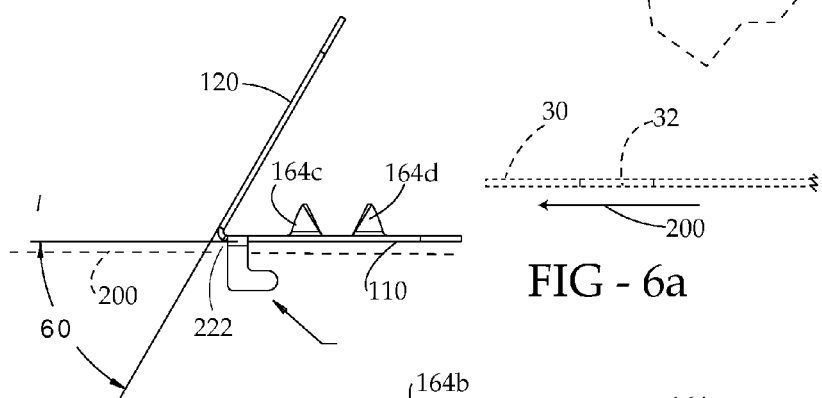

In FIG. 6, the plate 102 shown in FIG. 3 has been modified. More particularly, each of the tabs 164a-d has been rotated 90°. Additionally member 120 has been rotated about centerline 115 by approximately 120°. Each hook 140, 142 has been rotated 90° too. Subsequently, a mounting clip 100 is secured to each air bag tab 30. In FIG. 3, one such air bag tab 30 with its mounting hole 32 is shown spaced from an exemplary mounting clip 100. Arrow 200 shows the direction of movement of the air bag tab 30 enabling opening 32 to be placed about the upraised tabs 164a-d. These upraised clip tabs 164a-d act as a locating or centering mechanism keeping the air bag tab 30 properly aligned with the mounting clip 100. Also in FIG. 6 a work table or fixture 220 is shown below mounting clip 100. Fixture 220 includes two slots or openings 222 which are similar in shape to the mounting openings shown in FIGS. 5, 5a and 5b. Mounting clip 100 is slipped into these openings 222 thereby stabilizing the mounting clip and preparing the mounting clip to receive the air bag tab 30. FIG. 6a is a side view of the fixture 220 and a mounting clip 100 and also shows the air bag tab 30 in the process of being moved toward mounting clip 100, much the same as shown in FIG. 6. As can be appreciated, the mounting clip 100, in the configuration shown in FIG. 6, can be realized by a plastic injection molded part with the center region sufficiently flexible to enable members 110 and 122 being moved together to achieve the position shown in FIG. 6b. The plastic tabs 164a-d in general could not be crimped as is the case with metal tabs and would be welded (for example using rf plastic welding techniques) to the second member 120.

Figure 6B:
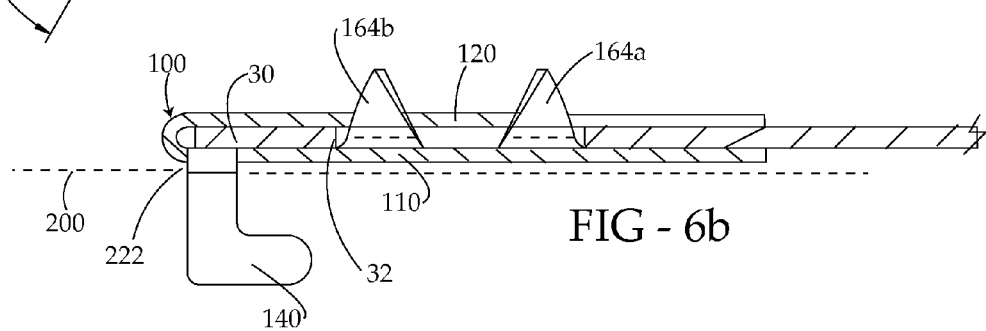

In FIG. 6b, which is a cross-sectional view through the center of mounting tab 100, the air bag tab 30 has been positioned about the clip tabs 164a-d. Additionally, member 120 has been rotated downwardly, essentially parallel to member 110. The spacing between members 110 and 120 has been chosen to be approximately equal to the thickness of the air bag tab which is in the range of 0.4 mm to 1.8 mm millimeters. In FIG. 6b two of the mounting tabs 164a and 164b are shown extending through opening 32. As will be seen, these mounting tabs 164a-d, which extend upwardly from member 110, are crimped over to capture member 120.

Reference is briefly made to FIG. 7 which shows a top view of the clip-tab combination shown in FIG. 6b. In FIG. 7 the mounting tabs 164a-b extend through the clover leaf shaped edges 173 of opening 170. Arrows 210 shows the outward direction that each mounting tab 164a-d is bent, thereby providing for the direct engagement between the central portion of member 110 and the central portion of member 120. The bending or crimping over of the tabs 164a-d maintains the fixed spacing between members 110 and 120; consequently, even if the physical characteristics of the air bag tab 30 change over time, the mounting bolt will not back out. As can be seen, when the fastener 250 is tightened, member 110 is loaded against the roof rail, however, the central portion of the mounting clip about openings 160 and 170 is not compressed against the tab or border region. As the fastener is tightened it also loads the bent-over tabs 164a-d, which are part of member 110, which prevent this compression of the mounting clip. In view of the above construction, the spacing of the members 110 and 120 of clip 100 is now independent of the characteristics of the material of the border portion of the air bag, torque relaxation is eliminated.

In the preferred embodiment of the invention the spacing between members 110 and 120 is approximately 0.4 mm-1.8 mm. The thickness of the material forming the mounting region will vary with the type of material specified. It is contemplated that a sufficiently robust mounting region or tab would be one with 2-4 layers of uncoated, 630 denier material. Experience has shown that a mounting region or tab having 4 layers of 630 denier material would have a thickness of about 1.8 mm. After member 120 has been rotated into a parallel relationship with member 110, the tabs 162a-d on member 110 and the set of tabs 172a-d on member 120 will also be in parallel alignment and spaced apart by the same distance. Similarly, the distal ends of each of the above tabs 162a-d and 172a-d are each spaced a similar distance from the geometric center of openings 160 and 170; the center of each opening is shown by 230. Mounting bolt 250 includes a threaded shaft 252 which is shown in dotted line in FIG. 7a. The spacing between the various tabs 162a-d and 172a-d is equal to a multiple of the pitch of the threads of shaft 252, which in the illustrated embodiment of FIG. 8 is 2 mm. In FIG. 8a, two tabs 172a and 172c of the set of four tabs 172a-d are shown bent, illustrating that the spacing between tabs 162a-d and 172a-d can be less than the spacing between the plates 110 and 120 to accommodate different thread patterns, including where the pitch is a sub-multiple of the spacing between plates 110 and 120. As can be appreciated, the tabs 172a-d (or tabs 162a-d or both) would be bent inwardly by a tool during assembly.

After the mounting clip 100 has been secured to the air bag tab 30 as shown in FIG. 7a, mounting bolt 250 is provided through openings 160 and 170 as also shown in FIG. 8 (and also shown in FIG. 2). The threads of mounting bolt 250 engage the distal ends of tabs 162a-d and 172a-d enabling the mounting bolt to be retained by the mounting clip and viewed as an integral part of the mounting clip. Only tabs 162a, b and 172a, b are shown in the cross-sectional view of FIG. 8, and in the configuration shown are crimped with member 120. As can be seen, with the hooks 140 and 142 engaging their respective openings in the roof rail 60, the fastener is positioned in alignment with the fastener opening 64 in the roof rail and the operator need only tighten the fastener. As can be appreciated since the mounting clip or clips 100 are now part of the air bag they can be viewed as also being part of the air bag module.

During the assembly of air bag module 50 to roof rail 60 the operator positions the module 50 proximate the roof rail and inserts hooks 140 and 142 of each mounting clip into a similar opening 72, 74 or 72a, 74a or 72b, 74b, which enables the pre-mounting or prefixation of the module to the roof rail 60 before it is finally secured. With the module 50 suspended from the roof rail by the individual mounting clips the operator is free to let go of the module 50 and pick up the wrench, screwdriver or other mechanism used to tighten each fastener 250 into its corresponding mounting hole 64. As each mounting bolt 250 is fully tightened the hooks 140 and 142 within the corresponding openings of the roof rail limit the amount of twisting that can occur with any of the air bag tabs/mounting clips. As previously mentioned, because of the direct connection of the central portions of members 110 and 120, these members will be fixed in place. Consequently any tendency of fastener 252 to back out is eliminated. Further, and as also previously mentioned, the mounting clip 100, if desired, is capable of retaining the mounting bolt 250 in the mounting clip 100 so that both can be shipped as part of the complete air bag module.

Figure 10A:
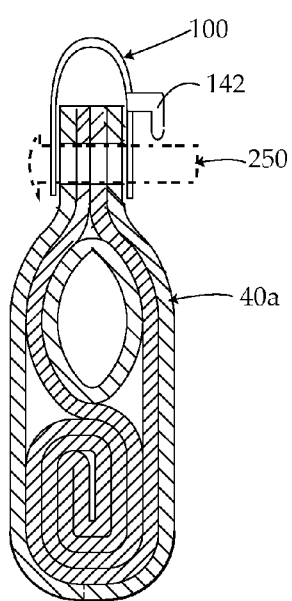
FIG. 10a is a cross-sectional view showing the mounting clip of FIG. 10 about the air bag and cover.

Reference is made to FIGS. 9 through 10a which show an alternate embodiment of the invention. FIG. 9 illustrates an alternate air bag module 50a comprising the air bag 20a and inflator 24. The air bag 20a includes a border region 23 at its top and at least one inflatable portion 26 position below the border region 23. Air bag 20a includes a distribution tube 25 having one end adapted to be connected with the inflator 24. Typically, distribution tubes include one or more openings to distribute inflation gas to designated locations of the inflatable portion 26. Air bag 20a differs from air bag 20 in that it does not include mounting tabs. The fastener openings 32 are formed within the border region 23.

Figure 9A:
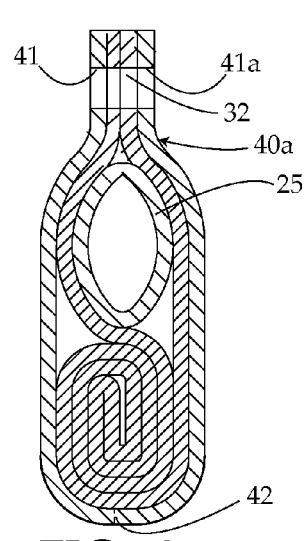
FIG. 9a is a cross-sectional view of a folded air bag showing a tearable cover holding the folded air bag in place.

Prior to installation in the vehicle, air bag 20a is folded, as shown in FIG. 9a. This folded air bag 20a is then wrapped with a cover or covering 40a which includes a line of perforations 42 which, as mentioned above, facilitate the opening of cover 40a. Cover 40a includes opposing sets of openings 41 and 41a. When cover 40a is wrapped about the folded air bag, openings 41 and 41a are in alignment with each of the fastener openings 32.

FIG. 10 illustrates that a plurality of mounting clips 100 has been placed about the cover 40a and air bag 20a. The cover 40a, air bag 20a and mounting clip 100 are shown in FIG. 10a. Additionally fastener 250 is shown extending through openings 160 and 170 of mounting clip 100 as well as through openings 32, 41 and 41a.

Many changes and modifications in the above-described embodiment of the invention can, of course, be carried out without departing from the scope thereof. Accordingly, that scope is intended to be limited only by the scope of the appended claims.

The invention claimed is:

1. An air bag module comprising:
a curtain air bag having an inflatable portion and a mounting portion, the mounting portion including opposing first and second mounting sides or surfaces;
a mounting bracket for the inflatable curtain air bag, comprising first and second plates, each plate respectively positioned opposite one of the first or second mounting side or surface of the mounting portion,
the first plate having a first opening and the second plate having a second opening;
the first plate about the first opening, including a plurality of bendable first tabs, each first tab deformable through the second opening to be positioned against an exterior surface of the second plate.

2. The module according to claim 1 wherein the bendable first tabs are configured to provide a crimp contact between the first plate and the second plate thereby trapping the mounting portion of the air bag between the first and second plates.

3. The air bag module according to claim 1 wherein the mounting bracket is configured to receive a mounting fastener to mount the module to a mounting surface, and upon tightening of the mounting fastener, the mounting fastener loads the first tabs.

4. The air bag module according to claim 3 including a plurality of integrally formed hooks configured to be received within a mounting opening in the mounting surface to hold the air bag in place upon the mounting surface prior to tightening of the mounting fastener, the hooks configured to limit rotation of the mounting clip upon tightening of the mounting fastener.

5. The air bag module according to claim 4 wherein the first or second plate is configured to hold the mounting fastener in the mounting clip prior to hooking the mounting clip to the mounting surface.

6. The air bag module according to claim 1 including a plurality of integrally formed hooks configured to be received within the mounting opening in the mounting surface to hold the air bag in place upon the mounting surface prior to tightening of the mounting fastener and to limit rotation of the mounting clip upon tightening of the mounting fastener.

7. The air bag module according to claim 1 wherein the first or the second plate includes a plurality of fastener support tabs, each tab of the plurality of fastener support tabs extending radially inwardly from an outer edge of the first or second opening, distal ends of each fastener support tab spaced from each other, the distal ends configured to threadably receive a threaded fastener thereto.

8. The air bag module according to claim 1 wherein the first plate includes a plurality of fastener support first tabs, each first tab extending radially inwardly from an outer edge of the first opening, distal ends of each first tab spaced from each other;
and wherein the second plate includes a plurality of fastener support second tabs, each second tab extending radially inwardly from an outer edge of the second opening, distal ends of each second tab spaced from each other;
wherein spacing between the distal ends of the first tabs and the second tabs are relatively configurable to receive a threaded fastener.

9. The air bag module according to claim 8 wherein the pitch of the teeth of the threaded fastener is equal to a multiple of or a sub-multiple of the spacing between the plates (110, 120).

10. The air bag module according to claim 9 wherein the bracket is configured as a metal stamping or as an injection molding.

11. A mounting bracket for an inflatable curtain air bag comprising first and second plates for engaging a mounting portion of the air bag, each plate engagable with a respective opposing side or surface of the mounting portion of the air bag, the first plate having a first opening and the second plate having a second opening;
the first plate about the first opening including a plurality of bendable first tabs, each first tab, deformed through the second opening to provide a crimp contact between the first plate and the second plate thereby trapping the mounting portion of the air bag therebetween.

12. A mounting bracket for an inflatable curtain air bag comprising first and second plates for engaging a mounting portion of the air bag, the plates configured to provide: a) prefixation of the air bag to a mounting surface, b) anti-twist of the mounting portion, c) anti-torque relaxation of a mounting fastener and d) retention of the mounting fastener.

13. The mounting bracket according to claim 12 wherein each plate is respectively positioned opposite one of a first or a second mounting side or surface of the mounting portion, and wherein
the first plate has a first opening and the second plate has a second opening;
the first plate about the first opening includes a plurality of bendable first tabs, each first tab deformable through the second opening to be positioned against an exterior surface of the second plate.

14. The air bag module according to claim 13 wherein the mounting bracket is configured to receive a mounting fastener to mount the mounting bracket to a mounting surface, and upon tightening of the mounting fastener, the mounting fastener loads the first tabs.

15. A mounting bracket for an inflatable curtain air bag:
the mounting bracket formed from a bendable flat metal plate, the plate having a first surface and an opposing second surface, the plate having a center portion and first and second members oppositely disposed and bendable about the center portion, the metal plate configured to be folded about the center portion to bring respective first surfaces of the first and second members from a planar orientation to a facing, spaced-apart orientation;
the first and second members each in the form of a geometric shape having a top, a bottom, and opposing first and second sides, each bottom being of a wider dimension than a corresponding top, the top of each of the first and second member being proximate to and forming part of the center portion;
the first member including integrally formed first and second hooks, each hook extending from a respective first or second side, distal ends of the first and second hooks extending near an imaginary line linking corresponding corners of the respective bottoms of the first and second members, the first and second hooks configured to be bendable perpendicularly to the first surface of the metal plate and once bent to extend over the second member;
the first member has a first opening and the second member has a second opening;
the first member about the first opening includes a plurality of bendable first tabs,
the bracket is configured that after the first and second members are placed in the spaced-apart orientation the end of each first tab is deformable through the second opening to provide a crimp contact between the first member and the second member to trap a mounting portion of the air bag therebetween;

the first member also including about the first opening a plurality of first fastener holding tabs, each first fastener holding tab located between two bendable first tabs, distal ends of each first fastener holding tab spaced from each other;

the second member includes a plurality of second fastener holding tabs, each second fastener holding tab extending radially inwardly from an outer edge of the second opening, distal ends of each second fastener holding tab spaced from each other;

wherein when the first and second members are in the spaced-apart orientation, the distal ends of the first and second fastener holding tabs are spaced apart and configured to receive a threaded fastener with a predetermined thread pitch, the spacing between the distal ends of the first or second fastener holding tabs or both of the first and second fastener holding tabs being correlated to the pitch of fastener thread.

16. The mounting bracket according to claim 15 wherein the first tabs are generally trapezoidal in shape.

17. The mounting bracket according to claim 15 wherein the first fastener holding tabs are narrow and generally rectangular in shape.

18. The mounting bracket according to claim 15 wherein the second fastener holding tabs are narrow and generally rectangular in shape.

19. The mounting bracket according to claim 15 wherein each hook does not extend beyond the imaginary line.

20. The mounting bracket according to claim 15 wherein the bracket is configured as a metal stamping or as an injection molding.

* * * * *